US007737320B1

(12) United States Patent
Kaminski et al.

(10) Patent No.: US 7,737,320 B1
(45) Date of Patent: Jun. 15, 2010

(54) COMPOSITION SUITABLE FOR DECONTAMINATING A POROUS SURFACE CONTAMINATED WITH CESIUM

(75) Inventors: Michael D. Kaminski, Lockport, IL (US); Martha R. Finck, Naperville, IL (US); Carol J. Mertz, Downers Grove, IL (US)

(73) Assignee: UChicago Argonne, LLC, Chicago, IL (US)

( * ) Notice: Subject to any disclaimer, the term of this patent is extended or adjusted under 35 U.S.C. 154(b) by 941 days.

(21) Appl. No.: 11/237,365

(22) Filed: Sep. 28, 2005

(51) Int. Cl.

| | |
|---|---|
| ***G21F 9/00*** | (2006.01) |
| ***G21F 9/16*** | (2006.01) |
| ***G21F 9/20*** | (2006.01) |
| ***B01D 15/00*** | (2006.01) |
| ***B01J 39/00*** | (2006.01) |
| ***C02F 1/42*** | (2006.01) |
| ***G21F 9/04*** | (2006.01) |
| ***C08F 290/14*** | (2006.01) |

(52) U.S. Cl. ....................... 588/7; 588/1; 588/6; 588/8; 588/20; 210/660; 210/681; 210/682; 525/50; 536/106

(58) Field of Classification Search ....................... None
See application file for complete search history.

(56) References Cited

U.S. PATENT DOCUMENTS 4,318,408 A * 3/1982 Korpman .................... 604/368
5,989,434 A * 11/1999 Lundquist et al. ........... 210/679
6,740,312 B2 * 5/2004 Chopin et al. ................. 424/59
7,151,447 B1 * 12/2006 Willms et al. ............... 340/540
2005/0059086 A1 * 3/2005 Huang et al. ................. 435/7.1

FOREIGN PATENT DOCUMENTS

JP 2005008753 A * 1/2005

OTHER PUBLICATIONS

Hietanen Raija, Jaakkola Timo and Miettinen Jorma, Sorption of Cesium, Strontium, Iodine and Carbon in Concrete and Sand, Mat. Res. Soc. Symp. Proc. vol. 44, 891-898, 1985.

Dosch R.G, Klavetter E.A. et al., Crystalline Silicotitanates—New Ion Exchanger for Selective Removal of Cesium and Strontium From Radwastes, Report SAND 96-1929, 1966.

Zheng Z and Anthony R.G., Modeling Multicomponent Ion Exchange Equilibrium Utilizing . . . Exchange Site Model, Ind. Eng. Chem. Res. vol. 36, 2427-2434, 1997.

* cited by examiner

*Primary Examiner*—Jerry Lorengo
*Assistant Examiner*—Jennifer A Smith
(74) *Attorney, Agent, or Firm*—Olson & Cepuritits, Ltd.

(57) ABSTRACT

A method of decontaminating porous surfaces contaminated with water soluble radionuclides by contacting the contaminated porous surfaces with an ionic solution capable of solubilizing radionuclides present in the porous surfaces followed by contacting the solubilized radionuclides with a gel containing a radionuclide chelator to bind the radionuclides to the gel, and physically removing the gel from the porous surfaces. A dry mix is also disclosed of a cross-linked ionic polymer salt, a linear ionic polymer salt, a radionuclide chelator, and a gel formation controller present in the range of from 0% to about 40% by weight of the dry mix, wherein the ionic polymer salts are granular and the non cross-linked ionic polymer salt is present as a minor constituent.

11 Claims, 4 Drawing Sheets

COMPOSITION SUITABLE FOR DECONTAMINATING A POROUS SURFACE CONTAMINATED WITH CESIUM

The United States Government has rights in this invention pursuant to Contract No. W-31-109-ENG-38 between the U.S. Department of Energy (DOE) and The University of Chicago representing Argonne National Laboratory.

FIELD OF THE INVENTION

This invention relates to a method of treating a porous surface to remove radioactive contamination. More specifically this invention relates to a method of decontaminating a porous surface contaminated with radioactive material.

BACKGROUND OF THE INVENTION

A "dirty bomb" is a conventional explosive such as dynamite packaged with radioactive material that scatters when the bomb goes off. A dirty bomb kills or injures through the initial blast of the conventional explosive and by airborne radiation and contamination. At present there are no non-destructive methods of cleaning porous surfaces, for example concrete, of the radioactive contamination. Present decontamination methods would mechanically remove or ablate the top several mm of a porous contaminated surface. Under the current threat of a dirty bomb attack, it becomes important to develop a method for the decontamination of large surface areas without resorting to mechanically altering the surface.

Cesium-137 is a radioactive material which might likely be one of the radioactive materials of choice for utilization in a dirty bomb because of its generally wide availability due to its use in industrial instrumentation. Cesium is very soluble and is often found in chloride powder form that is highly dispersible. Once in contact with a porous surface, the cesium is expected to be both attached as particulate to the surface and also dissolved into the pore structure or bound to ion exchange sites within the surface. Surface decontamination, other than mechanical removal, might consist of washing the surface with copious amounts of water, but this would require that the contaminated water be recovered to prevent further environmental contamination. A chelating agent might be added to the wash water to remove some of the contamination from the surface, but it might also promote ingress of the contamination deeper into the pore structure. Other radioactive elements include the actinides, more particularly, the transuranics, although not as readily available as Cs-137. Both Sr-90 and Co-60 are other radionuclides that are available for dirty bombs.

SUMMARY OF THE INVENTION

Accordingly, a principal object of the present invention is to provide a method of decontaminating porous surfaces contaminated with water soluble radionuclides without mechanically altering the surfaces and without producing copious amounts of radioactive waste materials.

Another object of the present invention is to provide a method and chemicals necessary to support a method of decontaminating porous surfaces contaminated with water soluble radionuclides, comprising contacting the contaminated porous surfaces with an ionic solution capable of solubilizing radionuclides present in the porous surfaces, contacting the solubilized radionuclides with a gel containing a radionuclide chelator to bind the radionuclides to the gel, and physically removing the gel from the porous surfaces.

Yet another object of the present invention is to provide a dry mix, comprising a cross-linked ionic polymer salt, a linear ionic polymer salt, a radionuclide chelator, and a gel formation controller present in the range of from 0% to about 40% by weight of said dry mix, wherein the ionic polymer salts are granular and the non cross-linked ionic polymer salt is present as a minor constituent.

Still another object of the present invention is to provide a dry mix for a gel formation controller activation composed of an alkaline earth metal salt and an alkaline earth metal ion sequestrant.

A final object of the present invention is to provide a method of decontaminating porous surfaces contaminated with water soluble radionuclides, by contacting the contaminated porous surfaces with an aqueous ionic solution having in the range of from about 0.01 to about 1.0 molar ammonium ions to solubilize the radionuclides, forming a hydrogel by adding in one or more steps a dry mix of a cross-linked ionic polymer salt, a linear ionic polymer salt, a radionuclide chelator, and adding a gel formation controller present in the range of from 0% to about 40% by weight of the dry mix to water containing ammonium ions, the linear ionic polymer salt being present as a minor constituent, applying the hydrogel to the solubilized radionuclides, and physically removing the gel from the porous surfaces.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE PREFERRED EMBODIMENT

Figure 1:
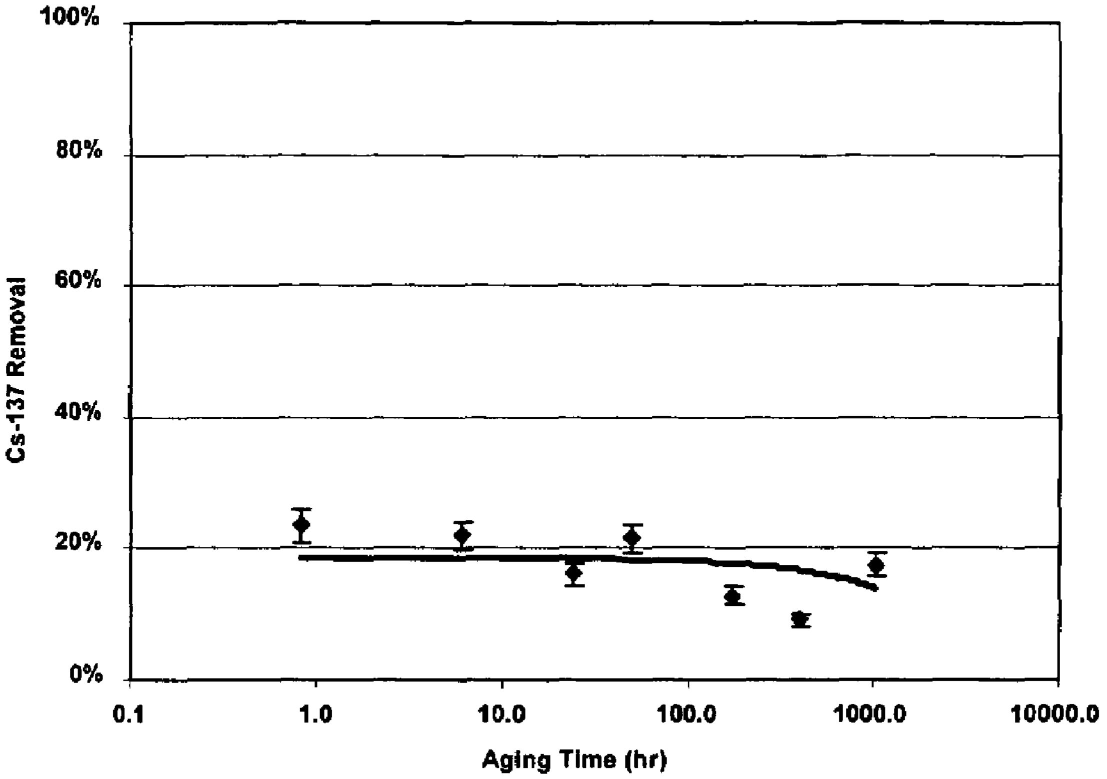
FIG. 1 is a graphical representation of cesium removal from coarse aggregate samples as a function of aging time (time lapsed between contamination and decontamination)

The inventive process for the decontamination of porous surfaces contains two primary components an ionic wash solution and an unsaturated solid or semi-solid media, such as a gel. The ionic wash solution is a water-based solution containing ammonium ions and/or phosphate ions. This solution is applied directly to the untreated surface, or after a primary decontamination has been carried out, such as a vacuuming or other means to remove any loose surface contamination. Only sufficient wash solution is applied to wet the surface, but not cause any run-off or as little as possible. The primary purpose of the wash solution is to provide copious, benign ions that can be substituted with any cesium ions that have bound to the concrete and to block ion exchange sites inside the porous material so that the cesium ions do not reabsorb to the concrete. After application of the wash solution, a highly hygroscopic semi-solid or solid media (like a gel) containing nano-microcrystalline silicotitanates (preferably) is applied to the surface. Use of the gel-like material has a number of advantages: 1) Because the material is gel-like, it will stick to the surface and remain adhered for a time sufficient to complete decontamination. 2) Because the material is unsaturated, it will soak water from the porous surface, providing a driving force for removing pore water and radioactivity from the surface and preventing further ingress of radioactivity into the surface. 3) Because of the presence of crystalline silicotitanates, it can sequester cesium selectively from sodium or calcium in a permanent bond that cannot be released back into the environment in mobile form if accidentally released. 4) Because cesium is constantly removed from the solution into the crystalline silicotitanates, there is a continuous concentration gradient (driving force) established between the concrete-bound cesium and the cesium-free solution to effect maximum decontamination passively. 5) Because the material is bound to the surface, it can easily be removed by vacuum methods. Also is a method by which the crystalline silicotitanates can be recycled. The decontamination technology can be extended to other porous surfaces such as granite, marble, wood, plastic, etc or non-porous surfaces such as steels.

The process is fully compatible with other radionuclides, such as Strontium-90 and mixed fission products, or the actinides, by substituting the silicotitanate within the hydroscopic material with an appropriate chelator for the particular radionuclide. Similarly, the ammonium ions of the wash solution may have to be replaced by counter ions to the particular radionuclide. The polymer can be removed by vacuum or other method and recycled by diluting the polymer, filtering the radioactivity (or by adsorptive means), and dewatering.

Example 1

The effectiveness of various ionic wash solutions was tested on contaminated concrete constituents: aggregate (fine and coarse sized) and cement material. The commercially available concrete mix materials were size fractioned prior to testing: fine aggregate, 0.15-2 mm; coarse aggregate, >2 mm; and cement pieces, >2 mm (prepared from Portland cement powder mixed with deionized water and aged for at least 30 days). The aggregate was shown to be the most difficult to decontaminate and the majority of testing focused on removal from coarse aggregate. In addition, no significant difference in decontamination was observed based upon surface area between coarse and fine aggregate. The coarse aggregate, according to the literature (Hietanen, et al., Mat. Res. Soc. Symp. Proc. Vol. 44, 1985), binds Cs much more effectively than the cement, so we chose to concentrate our testing on it. Testing the wash solution effectiveness on the coarse aggregate minimized interference from structure effects like porosity and diffusion that would be encountered with concrete samples.

Briefly, the testing involved adding 5 mL of deionized water to 5 g of pre-washed concrete (coarse or fine aggregate or cement) samples. The solution and samples were then spiked with 250 μL of a Cs-137 stock solution (20 μCi/L). The samples were in contact with the Cs-137 for 1 hr before the sample was rinsed with 5 mL of deionized water. The water rinse was immediately removed, and then the samples were analyzed by gamma counting for contamination levels. For the decontamination, 5 mL of the wash solution was added to the sample and removed after an aging time that ranged from 1 hour to 48 hours. It was found that aging the contaminant on the coarse aggregate prior to decontamination with a 0.1 molar ammonium chloride wash solution did not make a significant impact on the effectiveness of the decontamination for this time frame (refer to FIG. 1). The sample was then rinsed with 5 mL of deionized water and removed immediately. The sample was analyzed by gamma counting for Cs-137. Table 1 summarizes the single contact decontamination results of Cs-137 from concrete materials using a variety of wash (chemical) solutions and at different aging times for the contaminant on the concrete material. We looked at ammonium salts alone and in conjunction with phosphates. It was found that ammonium chloride solutions work well. Phosphates and pyrophosphates offer a mechanism to weakly etch cement and aggregate phase by binding divalent calcium ions and thus promote cesium release. Surfactants, as is well known in the art, can be added to increase penetration of the wash solution into the concrete pores.

The addition of anionic surfactant to ammonium chloride gives very good decontamination of the coarse aggregate. The most effective surfactant tested was sodium dodecyl sulfate, which wets the concrete surface without affecting the absorbency of the anionic polymer gel. The preferred binding to aggregate of cesium chloride is made evident by the results in Table 1 where the pure cement material is easily decontaminated upon a single contact.

TABLE 1

Decontamination Summary for Single Contact of a Wash Solution with Concrete Constituents.

| WASH SOLUTION | Coarse Aggregate | Fine Aggregate | Cement Material |
|---|---|---|---|
| 0.1 M $NH_4Cl$ (pH = 5.36) | 17.0% | 10.4% | |
| 0.1 M $NH_4Cl$/pH 4 buffer (pH = 3.88) | 22.2% | 22.8% | 80.8% |
| 0.1 M $NH_4Cl$/pH 7 buffer (pH = 6.85) | 21.9% | 19.9% | 81.1% |
| 1.0 M $NH_4Cl$ (pH = 4.81) | 21.1% | 21.4% | 81.7% |
| 0.1 M TSPP/1.0 M $NH_4Cl$ | 39.2% | | |
| 0.01 M TSPP/1.0 M $NH_4Cl$ | 19.4% | | |
| 0.01 M TSPP/1.0 M $NH_4Cl$ | 32.3% | | |
| 0.1 M TSPP | 11.6% | | |
| 0.01 M NaHMP/1.0 M $NH_4Cl$ | 29.7% | | |
| 0.1 M NaHMP/1.0 M $NH_4Cl$ | 30.4% | | |
| 0.1 M NaHMP | 14.0% | | |
| 1.0 M $NH_4H_2PO_4$ pH = 4.6 | 29.9% | 30.3% | 73.8% |
| 0.1 M $NH_4H_2PO_4$ (pH = 5) | 13.6% | | |
| 0.1 M $NH_4Cl$/0.1% SDS (pH = 5.45) | 26.6% | | |
| 0.1 M $NH_4Cl$/1.0% SDS (pH = 5.96) | 22.1% | | 75.9% |
| 0.1 M $Me_4AmCl$/0.1 M $NH_4Cl$ | 19.8% | | |
| 1.0% AMP (pH adjusted till AMP dissolves) pH = 7.5 | 14.1% | 9.4% | 71.0% |
| Water | 5.0% | 0.0% | 66.8% |
| 0.1 M $Na_3PO_4$ pH = 12.9 | 3.6% | 4.9% | 78.0% |

Abbreviations: SDS = sodium dodecyl sulfate; AMP = ammonium molybdophosphate, $(NH_4)_3PMO_{12}O_{40}$; TSPP = tetrasodium pyrophosphate, $Na_4P_2O_7$; NaHMP = sodium hexametaphosphate, $(NaPO_3)_6$

Example II

Two step wash solution/polymer gel decontamination application. Concrete monoliths were contaminated with CsCl stock solution (20 μCi/L) as described above. The monoliths were allowed to remain contaminated for periods ranging from 1 hour to 48 hours before treatment.

The wash solution was applied to the surface of the concrete monoliths. After a period of up to 60 min, the polymer was applied the surface at >1/16" or preferably 1/8" thick. The gel was allowed to react for up to 1 hr before removing. The monoliths were then analyzed by gamma counting for Cs-137 contamination.

Figure 2:
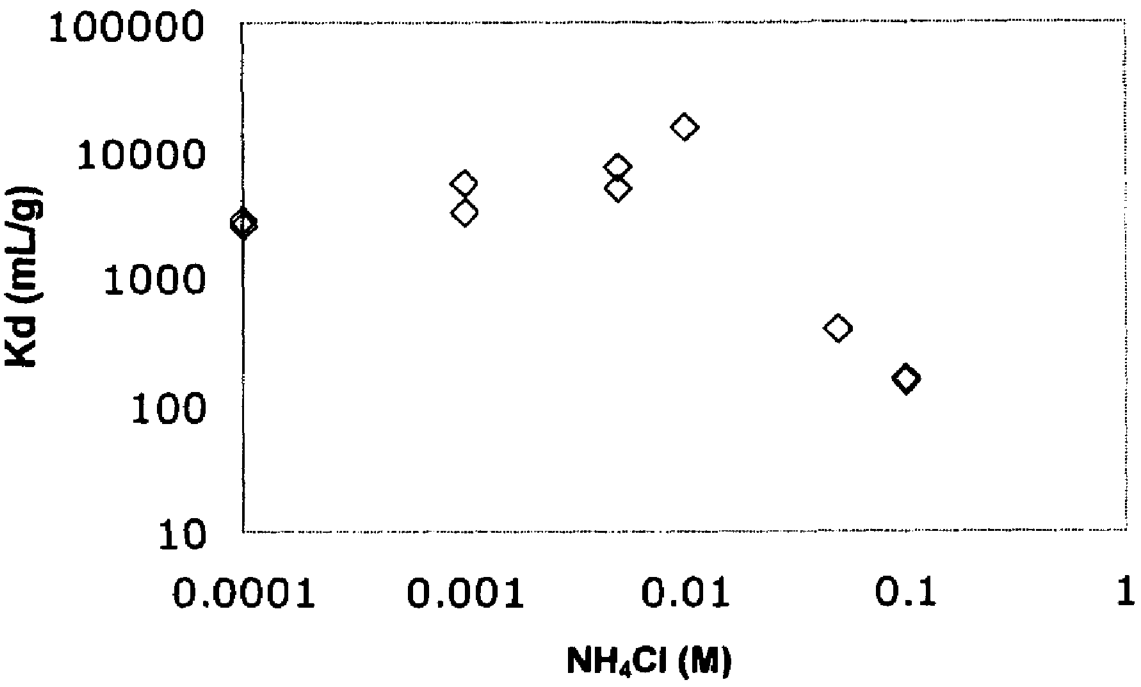
FIG. 2 is a graphical representation of partitioning coefficient for Cs onto CST (crystalline silicotitanates) in ammonium chloride solution.
Figure 3:
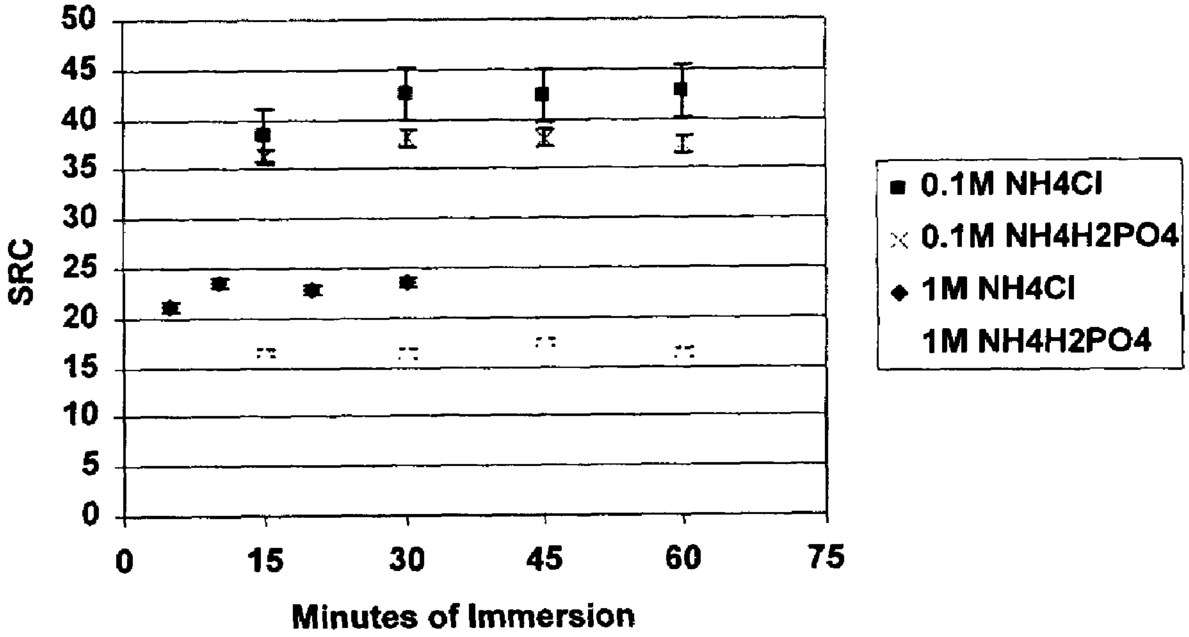
FIG. 3 is a graphical representation of superabsorbent retention capacity in ammonium salt solution.

The gel consists of a 2-5% (3% preferable) gel solution where the gel is comprised of 99% of cross-linked polymer (70% polyacrylamide/30% polyacrylate) and 1% of linear polymer (70% polyacrylamide/30% polyacrylate). The polymer powder is hydrated in a solution consisting of ammonium chloride or ammonium dihydrogen phosphate or other ammonium salts (<0.01-1.0 M). Dry polymer mesh size is not important for decontamination but affects sprayability (0.15 mm grain size works best while 0.5 mm requires prolonged mixing to dissolve the gel). Crystalline silicotitanate was added to 10% by mass of the polymer but may be increased by a factor of 10 with no effect on gel. Additives such as antifreeze and surfactant can be incorporated without substantial change in properties. Table 2 shows performance data comparing wash solution decontamination of coarse aggregate and cement pieces with wash solution/polymer gel decontamination of concrete monoliths. One molar ammonium chloride or ammonium dihydrogen phosphate is very effective solutions as either wash solutions or as polymer hydration solutions. While the higher decontamination is seen with the higher concentration of ammonium salts, a 0.1 molar or less concentration is preferred for the polymer gel. FIGS. 2 and 3 contain data from evaluations of the effect of ammonium ion concentration on the cesium sequestration by crystalline silicotitanate (CST) and on the retention capacity of the polymer gel, respectively.

TABLE 2

Decontamination of concrete components using wash solution and decontamination of concrete monoliths using wash solution and hydrated polymer gel

| Sample Type | Wash solution | Wash Soln Volume (mL) | Cs Removed (%) |
|---|---|---|---|
| Coarse Aggregate | 0.1 M NH4Cl | 5 | 17 |
| Cement Pieces | 0.1 M NH4Cl | 5 | 80.8 |
| Concrete Monolith | 0.1 M NH4Cl | 0.3 | 50.4 |
| Coarse Aggregate | 1.0 M NH4Cl | 5 | 21.1 |
| Cement Pieces | 1.0 M NH4Cl | 5 | 81.7 |
| Concrete Monolith | 1.0 M NH4Cl | 0.3 | 69.5 |
| Coarse Aggregate | 1.0 M NH4H2PO4 | 5 | 29.9 |
| Cement Pieces | 1.0 M NH4H2PO4 | 5 | 73.8 |
| Concrete Monolith | 1.0 M NH4H2PO4 | 0.3 | 68.9 |

Example III

The following tests were designed to evaluate the sorption of cesium onto crystalline silicotitanate (CST).

The crystalline silicotitanate (IONSIV-IE-910, Universal Oil Products) was used without further purification. All chemicals were reagent grade. Cesium-137 was obtained from house stock and measured by ICP-MS and gamma-ray spectroscopy for purity.

Cesium Sorption

We prepared wash solutions for $^{137}$Cs sorption samples and calibrated pipettes to the specified volume. We then placed 0.1 grams of crystalline silicotitanate (CST) in each test tube and added 9.0 mL of wash solution to each test tube. Each test tube was capped and gently dispersed. We added 150 γL $^{137}$Cs stock solution to each test tube, capped the test tubes, and gently dispersed the solution. The timer was started once $^{137}$Cs was added to the solution. The $^{137}$Cs was left on contact for indicated contamination times. The test tubes were centrifuged for five minutes at maximum rpm. We took duplicate 75 γL aliquots for centrifugation at 10,000 rpm for one minute through 0.22 μm filters. A 50 γL aliquot of the filtrate was added to a counting tube containing 150 γL of wash solution and mixed. A total 200 γL in each gamma tube was then placed in the Minaxi Gamma Counter for gamma analysis at 500-900 keV.

We tested the sorption kinetics of $^{137}$Cs sorption and found that $^{137}$Cs loading onto CST in 0.1M $NH_4Cl$ increased as a function of time. Approximately 100 minutes are required for $^{137}$Cs loading to reach equilibrium in 0.1M $NH_4Cl$. This $K_d$ was 230 mL/g for a 72% sequestration of cesium. When ammonium ions are absent and sodium ions are present in the solution, there was a significant increase in $^{137}$Cs sorption onto CST for a $K_d$=10,000 mL/g in agreement with previously reported results for high sodium waste streams. Based upon the work of Dosch et al. (1996, Report: SAND96-1929), it has been postulated that the crystal structure of the CST optimizes selectivity for cesium over sodium when the d-spacing is 0.78 mm which allows diffusion of non-hydrated sodium ion out of the CST and replacement by the hydrated cesium ion. The ion exchange properties of cesium in CST and the competitive effect of acidic and alkali systems have been investigated by Zheng et al. (1997, Ind. Eng. Chem. Res. 36, 2427-2434) and can be used to explain cesium distribution coefficients. We investigated the effect of $NH_4Cl$ concentrations on $^{137}$Cs partitioning onto CST (FIG. 2). The partitioning coefficient for cesium onto CST increased from approximately 2000 to 10,000 as the ammonium chloride concentration was increased from 0.0001 to 0.01 molar. However, a significant decrease in $^{137}$Cs partitioning onto CST was observed above 0.01M $NH_4Cl$ concentration (reduced by a factor of 100).

FIG. 3 illustrates the effect of ammonium salt concentration on the absorbency of the polymer used in the decontamination system. Superabsorbent retention capacity (SRC) determines the equilibrium absorbent capacity of a polymer powder formulation in a given aqueous solution. We evaluated a polymer formulation comprising of 99% of cross-linked polymer (70% polyacrylamide/30% polyacrylate) and 1% of linear polymer (70% polyacrylamide/30% polyacrylate) in what is commonly known as a tea bag test according to the following procedure. Six tea bags (13.9 cm×7.2 cm) were constructed from a sheet of Ahlstrom fabric. Each 13.9 cm×7.2 cm sheet was folded in half and a 10 mm wide strip was heat sealed along both ends. After duplicate samples of 0.2 plus or minus 0.005 grams of dry polymer formulation were placed into each porous bag, the open end of the bag was sealed. Each tea bag was held horizontally above a pan to distribute the dry polymer throughout the tea bag. Tea bags were placed on the surface of the solution, and after sixty seconds, were submerged completely for indicated immersion times in 1 L of wash solution. After the indicated immersion time, the tea bags were placed on individual, twice-folded, lint-free wipes for ten minutes to remove unabsorbed solution. The weight of each wet polymer formulation was recorded after thirty seconds on the analytical balance. For each duplicate sample, a blank tea bag was immersed for the same indicated time, and the weight of the wet blank tea bag was recorded after thirty seconds on the analytical balance. The calculation for the Superabsorbent Retention Capacity (SRC) was given as (grams of absorbed fluid/grams of dry polymer)=(W3−W2−W1)÷W1: W3=weight of wet polymer and tea bag; W2=weight of wet blank tea bag; W1=weight of dry polymer. The final result was the arithmetic mean of the duplicate sample measurements and was reported with no decimal point. Ionic wash solutions were composed of: 1M $NH_4Cl$ or 0.1M $NH_4Cl$; and 1M or 0.1M $NH_4H_2PO_4$.

As can be seen in FIG. 3, the SRC of this polymer formulation is higher in 0.1 M ammonium salt solution. The anionic charge on the acrylate units of the polymer responds to higher ionic strength of the solution by an overall decrease in polymer absorbency. This salt sensitivity is mitigated by the neutral acrylamide units in this copolymer designed for robust absorbency in the presence of minerals.

The ideal method of application of this decontamination system comprises of a two step process where the initial ionic wash solution consists of 1.0 M or higher of ammonium salts and the polymer gel containing the cesium chelator CST is hydrated in a less concentrated ammonium ion solution. This allows for superior dissolution of cesium on the concrete surface and high absorbency of the contaminated solution into the gel and finally chelation within the gel by sorption onto CST.

Example IV

Tests were conducted to verify delayed cross-linking action of a polymer formulation. Anionic non cross-linked polymer candidates were added to a solution of $CaSO_4$ and TSPP. TSPP, or tetra sodium pyro phosphate, is an effective reversible chelator for divalent calcium ions. The pre-mixed TSPP/$CaSO_4$ solutions provide a slow release of calcium ions for crosslinking of the carboxylate moieties of the sodium alginate. The poly (acrylate) moieties are much less susceptible to divalent calcium ion cross linking than the carboxylate moieties of the alginate.

Methods: A 1% suspension of Na alginate was prepared in 360 mL, 380 mL, or 400 mL of deionized $H_2O$ while mixing with the torque stirrer at 800 RPM for twenty minutes. The torque stirrer offered maximum uniformity of the gel formulation; however, the stirrer had to maintain a vortex and a speed of 800 RPM to achieve homogeneity. We found that the three materials could not be mixed simultaneously nor could sodium alginate be added as a solution due to agglomeration of the polymer. The anionic non cross-linked poly (acrylic acid, sodium salt) did not readily react to calcium. We discovered cross-linking of all Na alginate formulations in <5 minutes. Viscosity measurements of the 1% Na alginate suspensions were recorded to ensure similar viscosities of the suspensions. A solution comprised of $CaSO_4$ and TSPP was then added to each Na alginate suspension while mixing with the torque stirrer at 600 RPM for one minute. Final solutions contained 1% Na alginate, and 0.25 wt % TSPP with varying amounts of $CaSO_4$ (0.6 wt %, 0.5 wt %, or 0.4 wt %) in 20 mL or 40 mL of deionized $H_2O$. To determine the onset of gelation, viscosity measurements were recorded every minute until the reading fluctuated. The fluctuation indicated the completion of gelation.

Figure 4:
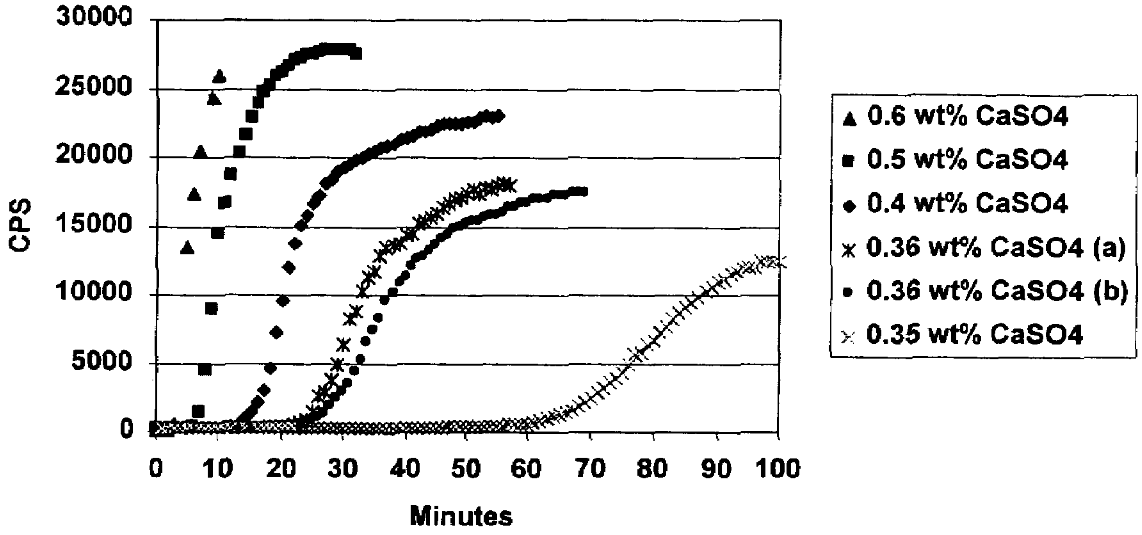
FIG. 4 is a graphical representation of the viscosity results of 1% Na alginate with 0.25 wt % TSPP and as a function of wt % of $CaSO_4$.

We investigated delayed cross-linking of polymer formulations. The onset of gelation was affected by the reduction of $CaSO_4$ as well as the polymer formulation. The viscosity results of 1% Na alginate with 0.25 wt % TSPP demonstrate that a lower wt % of $CaSO_4$ delays the onset of gelation as shown in FIG. 4. Ideally, we would like to delay the cross-linking for approximately sixty minutes. The purpose of a longer onset of gelation is to allow more time for preparation and application of the superabsorbent gel.

A related method of application involved the incorporation of sodium alginate into the dry polymer mix in the amount of 25 to 33 weight % based on dry mix. This dry mix was hydrated to a 1.5% level and sprayed. This sprayed polymer gel layer was subsequently sprayed with an aqueous solution of 0.2 M calcium chloride to immediately cross link the outer surface of the polymer gel layer while maintaining a contact layer of polymer gel on the inner surface. The gel layer was removed by wet vacuum. This technique achieved several objectives:

1) a higher hydration level of polymer gel is in contact with the contaminated surface for better decontamination, 2) the outer calcium cross linked layer minimizes mobility on the wall$_{[cjml]}$; and 3) the polymer gel with the crosslinked outer surface is more resistant to premature removal by rain or dehydration by high temperatures.

As seen therefore, a method of decontaminating porous surfaces contaminated with water soluble radionuclides has been provided as well as various dry mixes which may be stored on site for use in various situations. A variety of cross linked and linert powder have been disclosed and a variety of chelators have been disclosed particularly those which are best for the variety of radionuclides which may be present.

As hereinbefore stated, the preferred cross-linked polymers are one or more of poly (acrylamide), poly (sodium acrylate), poly (potassium acrylate), (sodium acrylate acrylamide) copolymer, (potassium acrylate acrylamide) copolymer, poly (N-isopropylacrylamide), poly (2-(acrylamido)-2-methylpropanesulfonic acid), and combinations of these polymers whereas the preferred linear polymers are one or more of poly (acrylamide), poly (sodium acrylate), poly (potassium acrylate), (sodium acrylate acrylamide) copolymer, (potassium acrylate acrylamide) copolymer, poly (N-isopropylacrylamide), poly (2-(acrylamido)-2-methylpropanesulfonic acid), and combinations of these polymers.

The chelators where the radionuclide is plutonium is one or more of CMPO or TBP or HEDPA or DHEPA or TOPO or DTPA or primary/secondary tertiary organic amines.

Where the radionuclide is Am, the radionuclide chelator is one or more of CMPO or TBP or HEDPA or DHEPA or TOPO or DTPA or primary/secondary/tertiary organic amines.

Where the radionuclide is Sr, then the chelator is one or more of cobalt dicarbollide, calixarenes, titanates, or niobates.

Where the radionuclide is Np or U, the chelator is one or more of CMPO or TBP or HEDPA or DHEPA or TOPO or DTPA or primary/secondary/tertiary organic amines.

Where the radionuclide is Cesium, Sr or Co, the radionuclide chelator is one or more of crystalline silicotitanate (CST), n-octylphenyl-N,N-diisobutylcarbamoylmethylphosphine oxide (CMPO), tri butyl phosphate (TBP), 1-hydroxyethane-1,1-disphosphonic acid (HEDPA), di-2-ethylhexylphosphoric acid (DHEPA), trioctylphosphine oxide (TOPO), diethylenetriaminepentaacetate (DTPA), primary/secondary/tertiary organic amines including one or more of aminethiol, ethylene diamine, cobalt dicarbollide, calixarenes, titanates, niobates, ammonium molybdophosphate (AMP), ethylene diamine tetra acetic acid (EDTA), vinyl diphosphonic acid (VDPA), and (trimethylpentyl)phosphinic acid (TPPA) with CST being the preferred chelator with Cesium which is preferably present from about 0.001% to about 30% by weight of the dry mix described herein and is more preferably present at about a concentration of about 10% by weight of the dry mix.

As stated, the preferred weight ratio of cross-linked polymer to linear polymer is about 99:1 and the preferred ionic polymer is a copolymer of polyacrylate amide and polyacrylate. A gel formation controller is used in order to control the time lapse for gel formation and it is generally present in the range of from about 20% to about 35% of the dry mix and is most preferably one or more of linear sodium polyacrylate, linear potassium polyacrylate, linear sodium polymethacrylate, linear potassium polymethacrylate, linear sodium alginic acid, carboxymethyl cellulose.

The preferred dry mix used in the present invention is a cross-linked ionic polymer salt and a potassium acrylate acrylamide copolymer (30/70) and the linear ionic polymer salt is a potassium acrylate acrylamide copolymer (30/70) in the weight ratio of about 99:1. The radionuclide chelator is CST present at about 10% by weight of the dry mix and the gel formation controller is one or more of sodium alginate or alginic acid present at about 25% to about 33% by weight of the dry mix.

While there has been disclosed what is considered to be the preferred embodiments of the present invention, it is understood that various changes in the details may be made without departing from the spirit, or sacrificing any of the advantages of the present invention.

The invention claimed is:

1. A dry mix suitable for forming an aqueous gel that is capable of removing cesium ions from a porous surface contaminated with radioactive cesium, the dry mix consisting of:

a cross-linked ionic polymer salt, a linear ionic polymer salt, a radionuclide chelator, and a gel formation controller present in the range of from about 20% to about 35% by weight of said dry mix, wherein said ionic polymer salts are granular and said linear ionic polymer salt is present as a minor constituent.

2. The dry mix of claim 1, wherein the weight ratio of said cross-linked ionic polymer salt to said linear ionic polymer salt is about 99:1.

3. The dry mix of claim 1, wherein said cross-linked ionic polymer is a copolymer of polyacrylamide and polyacrylate.

4. The dry mix of claim 1, wherein said linear ionic polymer is a copolymer of polyacrylamide and polyacrylate.

5. The dry mix of claim 1, wherein said gel formation controller is one or more of linear sodium polyacrylate, linear potassium polyacrylate, linear sodium polymethacrylate, linear potassium polymethacrylate, linear sodium alginic acid, and carboxymethyl cellulose.

6. The dry mix of claim 5, wherein said gel formation controller is an alginic acid derivative.

7. The dry mix of claim 6, wherein said alginic acid derivative is one or more of sodium alginate or alginic acid present at about 25% to about 33% by weight of said dry mix.

8. The dry mix of claim 1, wherein said radionuclide chelator is one or more of crystalline silicotitanate (CST), n-octylphenyl-N,N-diisobutylcarbamoyl methylphosphine oxide (CMPO), tri butyl phosphate (TBP), 1-hydroxyethane-1,1-disphosphonic acid (HEDPA), di-2-ethylhexylphosphoric acid (DHEPA), trioctylphosphine oxide (TOPO), diethylenetriaminepentaacetate (DTPA), primary/secondary/tertiary organic amines, cobalt dicarbollide, calixarenes, titanates, niobates, ammonium molybdophosphate (AMP), and (trimethylpentyl)phosphinic acid (TPPA).

9. The dry mix of claim 8, wherein said radionuclide chelator is CST present in the range of from about 0.001% to about 30% by weight of said dry mix.

10. The dry mix of claim 9, wherein said CST is present in an amount of about 10% by weight of said dry mix.

11. The dry mix of claim 1, wherein said cross-linked ionic polymer salt is a potassium acrylate acrylamide copolymer (30/70) and said linear ionic polymer salt is a potassium acrylate acrylamide copolymer (30/70) in the weight ratio of about 99:1 and said radionuclide chelator is CST present at about 10% by weight of said dry mix and said gel formation controller is one or more of sodium alginate or alginic acid present at about 25% to about 33% by weight of said dry mix.

* * * * *